(12) United States Patent
Nakano et al.

(10) Patent No.: US 7,531,121 B2
(45) Date of Patent: May 12, 2009

(54) METHOD FOR MANUFACTURING THERMOSETTING FIBER REINFORCED PLASTIC

(75) Inventors: Tsunehiko Nakano, Sayama (JP); Makoto Okamoto, Kawasaki (JP); Shuntaro Kuriyama, Fuchu (JP)

(73) Assignee: Jamco Corporation, Tokyo (JP)

( * ) Notice: Subject to any disclaimer, the term of this patent is extended or adjusted under 35 U.S.C. 154(b) by 108 days.

(21) Appl. No.: 11/074,841

(22) Filed: Mar. 9, 2005

(65) Prior Publication Data
US 2005/0199336 A1    Sep. 15, 2005

(30) Foreign Application Priority Data
Mar. 9, 2004    (JP) ............... 2004-065460

(51) Int. Cl.
*B29C 43/20* (2006.01)
*B29C 43/04* (2006.01)
*B32B 19/02* (2006.01)
*B32B 27/04* (2006.01)

(52) U.S. Cl. ............ 264/322; 264/324; 264/293; 425/502; 425/394

(58) Field of Classification Search ......... 264/257–258, 264/284, 293, 296, 322, 324; 425/502, 394
See application file for complete search history.

(56) References Cited

U.S. PATENT DOCUMENTS 3,229,008 A * 1/1966 Harrington et al. .......... 264/122
4,234,648 A * 11/1980 Patz et al. ................... 442/229
5,494,627 A * 2/1996 Kargol et al. ............... 264/119

FOREIGN PATENT DOCUMENTS

| JP | S50-44253   | 4/1975 |
| JP | S57-128544  | 8/1982 |
| JP | 6-122143    | 5/1994 |
| JP | H07-214680  | 8/1995 |
| JP | 2003-001658 | 1/2003 |

OTHER PUBLICATIONS

Translation of JP 2003-001658, Molding Method for FRP Molded Article, pp. 1-31.*
Office Action dated Jun. 20, 2006 issued in corresponding Japanese Patent Application No. 2004-065460.

* cited by examiner

*Primary Examiner*—Matthew J. Daniels
(74) *Attorney, Agent, or Firm*—Westerman, Hattori, Daniels & Adrian, LLP.

(57) ABSTRACT

The invention provides a method for simultaneously forming a surface texturing pattern (embossed pattern) on the surface of an FRP product when manufacturing the FRP product by hot-pressing a prepreg material. A prepreg material 2 is a woven sheet formed by weaving a weft 10 and a warp 20 which is impregnated with thermosetting resin 40. A release film laminate 100 formed by sandwiching an adhesive film 130 between release films 110 and 120 is placed on a surface to be provided with surface texturing, before subjecting the same to hot-pressing. The softening temperature of the adhesive film 130 is close to the curing temperature of the thermosetting resin 40, so as to allow the thermosetting resin 40 to be pushed into the space between hard FRP fibers during hot-pressing and to form the surface texturing pattern on the surface of the member.

2 Claims, 7 Drawing Sheets

METHOD FOR MANUFACTURING THERMOSETTING FIBER REINFORCED PLASTIC

The present application is based on and claims priority of Japanese patent application No. 2004-065460 filed on Mar. 9, 2004, the entire contents of which are hereby incorporated by reference.

BACKGROUND OF THE INVENTION

1. Field of the Invention

The present invention relates to a method for manufacturing a thermosetting FRP (fiber reinforced plastic).

2. Description of the Related Art

Heretofore, there has been known a method for manufacturing a composite material by laminating a number of FRP (fiber reinforced plastic) sheets which are impregnated with thermosetting adhesive resin, which are so-called prepregs, and subjecting the same to hot press treatment to manufacture the composite.

The composite is formed, for example, as a long channel member, and cut to necessary lengths for use. The composite channel member is light weight and has high strength, and the channel members are often bonded to other panel members etc. to form a structure.

FIG. 6 is an explanatory view showing a common hot press treatment for thermosetting FRP.

As illustrated in FIG. 5, an FRP sheet 1 used as the material is a woven sheet 1 formed by weaving a weft 10 and a warp 20 of FRP fiber in a plain weave style, as shown in FIG. 5(a), or by weaving the weft 10 and warp 20 respectively tilted for 45 degrees in a 45-degree plain weave style, as shown in FIG. 5(b).

The woven sheet 1 has a gap 30 formed at a crossing section between the weft 10 and the warp 20, and in the gap 30 is impregnated the thermosetting resin, thereby obtaining the prepreg sheet 2.

As shown in FIG. 7, release films 50 and 60 are disposed on the upper and lower surfaces of the prepreg sheet 2, and then as shown in FIG. 8, the prepreg sheet is sandwiched between an upper mold 70 and a lower mold 80 of a hot press to be subjected to heating and pressurizing for a given period of time.

The selected thermosetting resin 40 has a curing temperature of 120 to 130° C.

The release films 50 and 60 are for preventing the thermosetting resin 40 oozing out of the prepreg sheet 2 from adhering to the surface of the press molds 70 and 80. The softening temperature of the release films is selected to be higher than the curing temperature of the thermosetting resin, or approximately 260° C.

When the hot press treatment is completed, the release films are peeled off and a product 3 is obtained. Surfaces 3a and 3b of the product 3 are smooth.

FIG. 9 shows a channel member manufactured according to the above-mentioned method. The channel member has an angulated U-shaped cross-section with three faces 3a, 3b and 3c.

In many cases, these types of channel members are bonded to other sheet members or panel members to constitute a structure. In such use, the channel member should preferably have fine uneven patterns formed to the surface thereof to enhance adhesiveness.

One process for providing uneven patterns on the surface of a resin member is known as surface texturing (embossing).

Japanese Patent Application Laid-Open Publication No. 06-122143 discloses such surface texturing process.

According to the art disclosed in the above-mentioned patent document, surface texturing is provided to the surface of a molded product by use of a transfer film having a surface texturing pattern formed thereon.

SUMMARY OF THE INVENTION

The present invention provides a method for manufacturing a thermosetting-type FRP product provided with surface texturing that does not require the use of a transfer film.

The method for manufacturing an FRP product according to the present invention in which a hot press treatment is provided to a prepreg sheet which is a woven sheet of reinforced fiber impregnated with thermosetting resin includes forming a surface texturing pattern on the surface of the FRP product using a release film laminate (laminated body) formed by laminating a low-melting film between two release films as the release film to be placed between the prepreg sheet and the hot press mold.

The two release films of the release film laminate has sufficiently high softening temperature compared to the curing temperature of the thermosetting resin being impregnated in the prepreg sheet, and the adhesive film has a softening temperature that is close to the curing temperature of the thermosetting resin.

As described above, the present invention enables to form a surface texturing pattern on the surface of an FRP product without using transfer films or the like. Therefore, the invention enables to enhance the adhesiveness with other members of the FRP product.

DETAILED DESCRIPTION OF THE PREFERRED EMBODIMENTS

Figure 1:
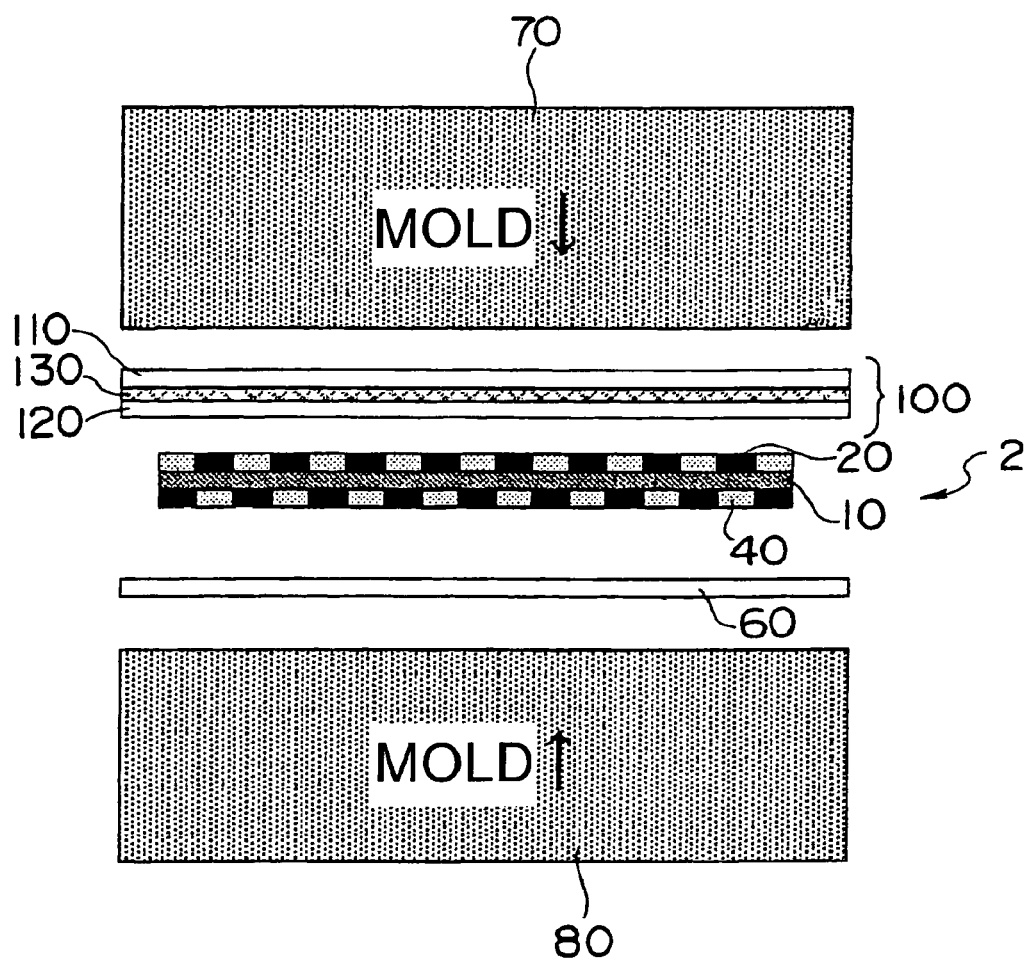
FIG. 1 is an explanatory view showing the manufacturing method according to the present invention.

FIG. 1 is an explanatory view showing the manufacturing method according to the present invention.

The structure of a prepreg FRP sheet 2 which is the object of processing according to the present invention is substantially the same as that of the abovementioned prior art.

A release film laminate 100 used in the present invention is structured so that an adhesive film 130 is laminated between two release films 110 and 120.

The softening temperature of the two release films 110 and 120 can be, for example, 260° C. The softening temperature of the adhesive film 130 can be, for example, 120° C. In other words, the softening temperature of the adhesive film 130 is close to the curing temperature of a resin 40 impregnated in the FRP sheet constituting the prepreg member.

Figure 2:
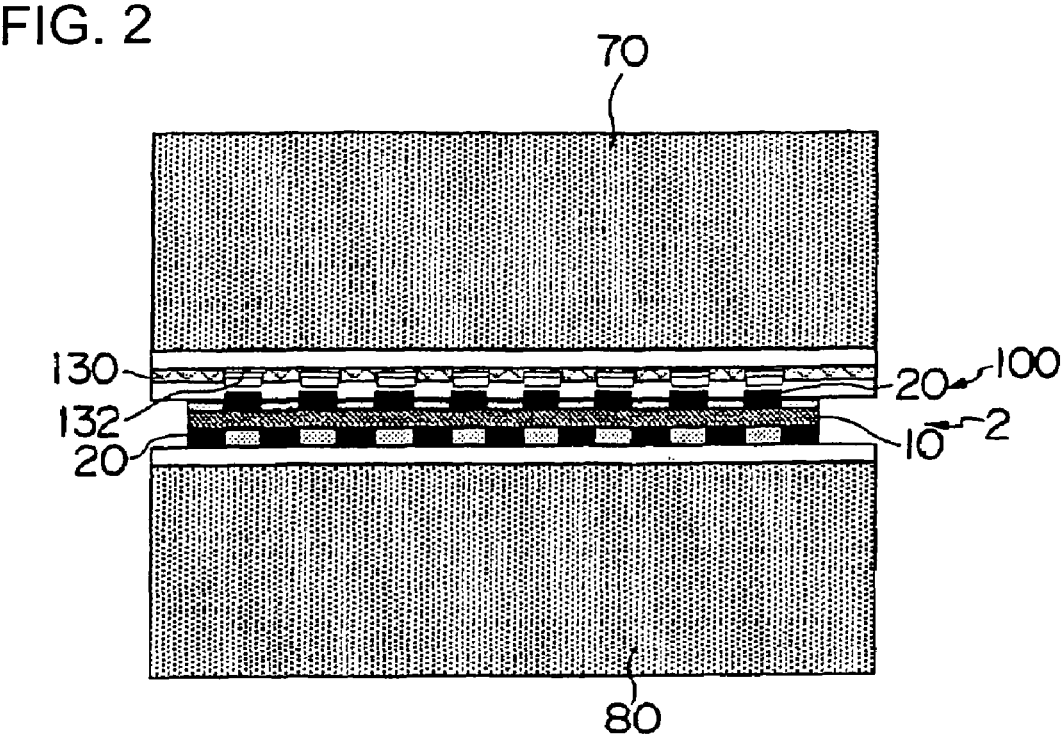
FIG. 2 is an explanatory view showing the manufacturing method according to the present invention.

As shown in FIG. 2, the release film laminate 100 is layered on a surface of the prepreg sheet 2 to be subjected to surface texturing, and the layered members are subjected to hot pressing.

When the members are heated to approximately 120° C. via hot press, the adhesive film 130 in the release film laminate 100 is softened.

By having pressure applied by the press, the portion of the release film laminate 100 coming into contact with the FRP fiber 20 having high degree of hardness is pressed, by which a recessed portion is formed. Other parts of the release film laminate 100 press the thermosetting resin impregnated in the prepreg sheet, forming a height difference between the portion corresponding to where the fiber is positioned.

Figure 3:
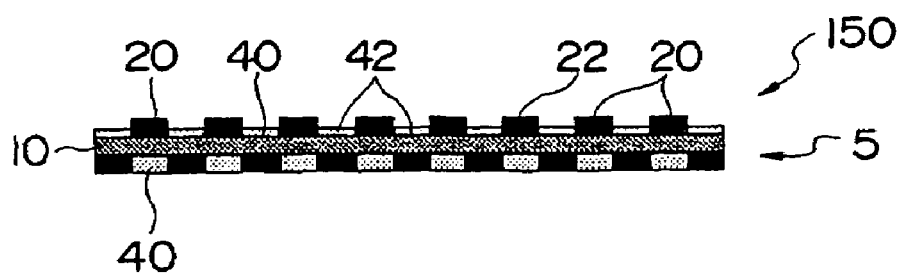
FIG. 3 is an explanatory view of an FRP product according to the present invention.

FIG. 3 is an explanatory view showing the structure of an FRP product 3a having completed thermosetting by the hot press.

The surface of the product having been hot-pressed via the release film laminate 100 is formed so that the height of upper surface 42 of the thermosetting resin 40 is lower than the upper surface of the fiber 20, by which recessed portions are formed. Thus, the fiber 20 and the resin 40 form the so-called surface texturing pattern (embossed pattern) 150.

Figure 4:
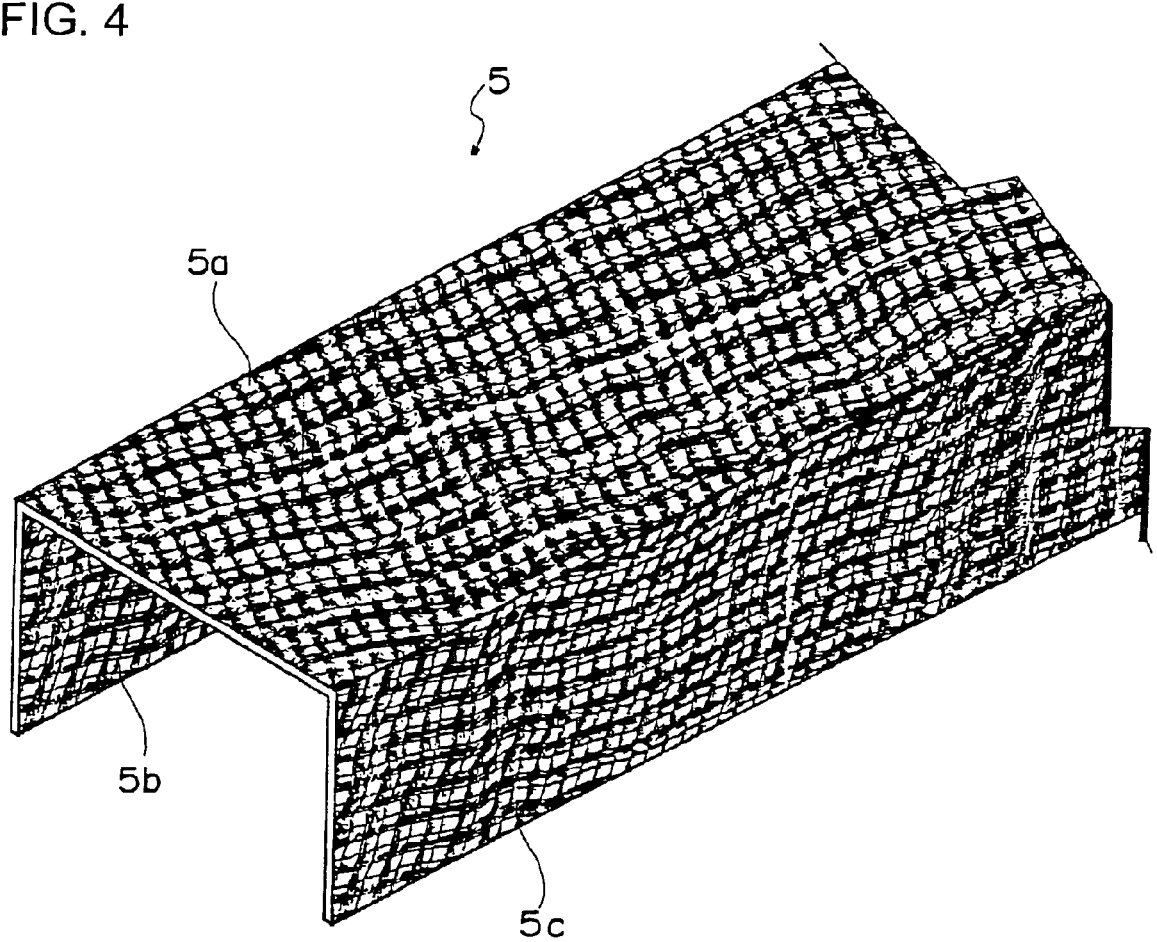
FIG. 4 is an explanatory view of an FRP channel member according to the present invention.
Figure 5A:
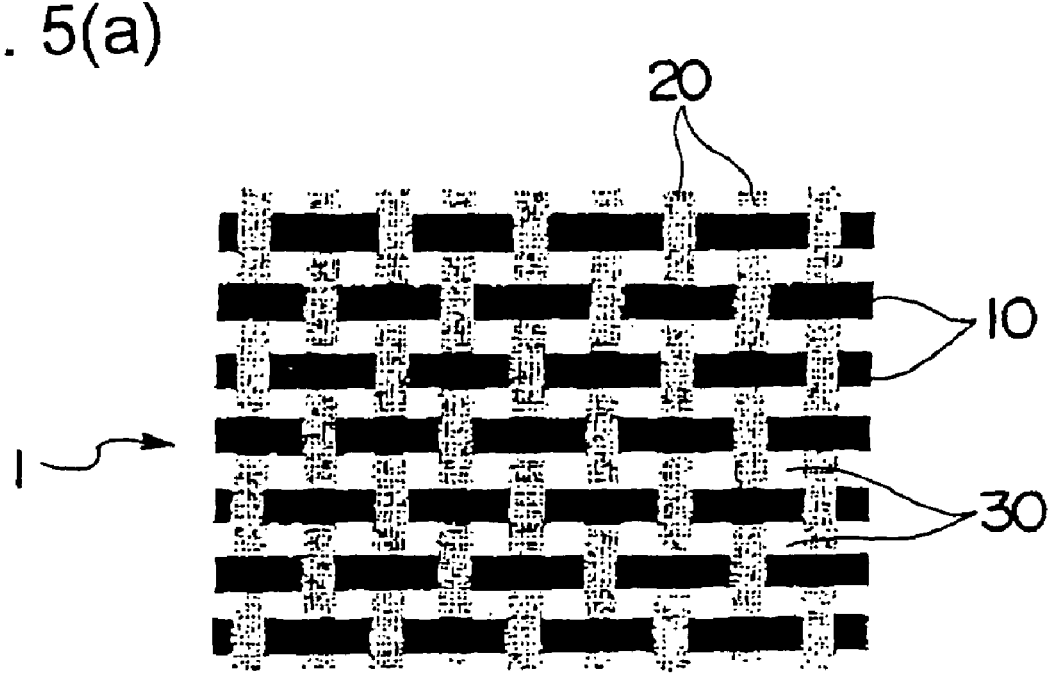
FIG. 5 is an explanatory view of an FRP woven sheet.
Figure 5B:
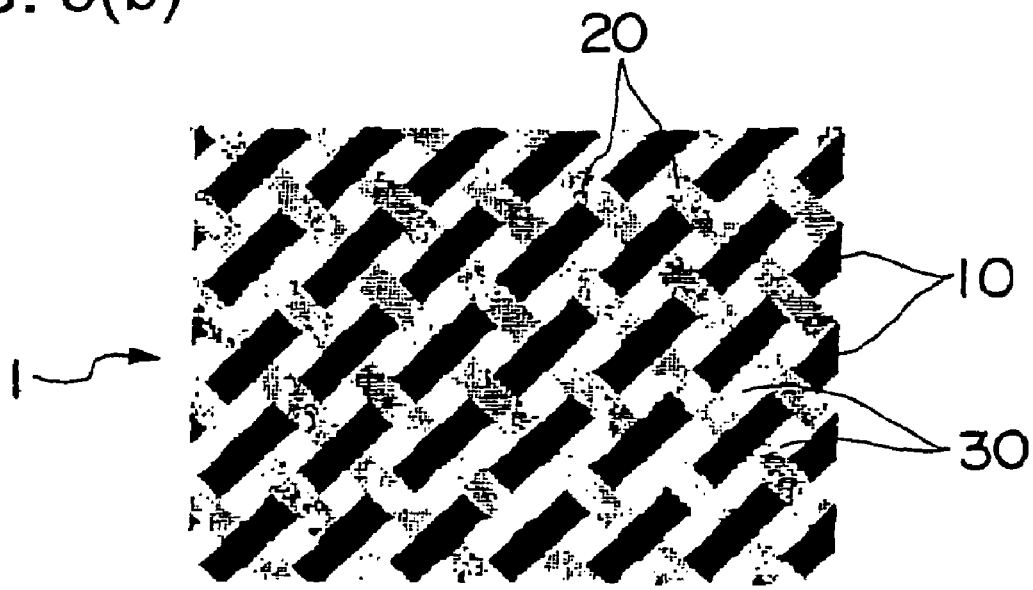
Figure 6:
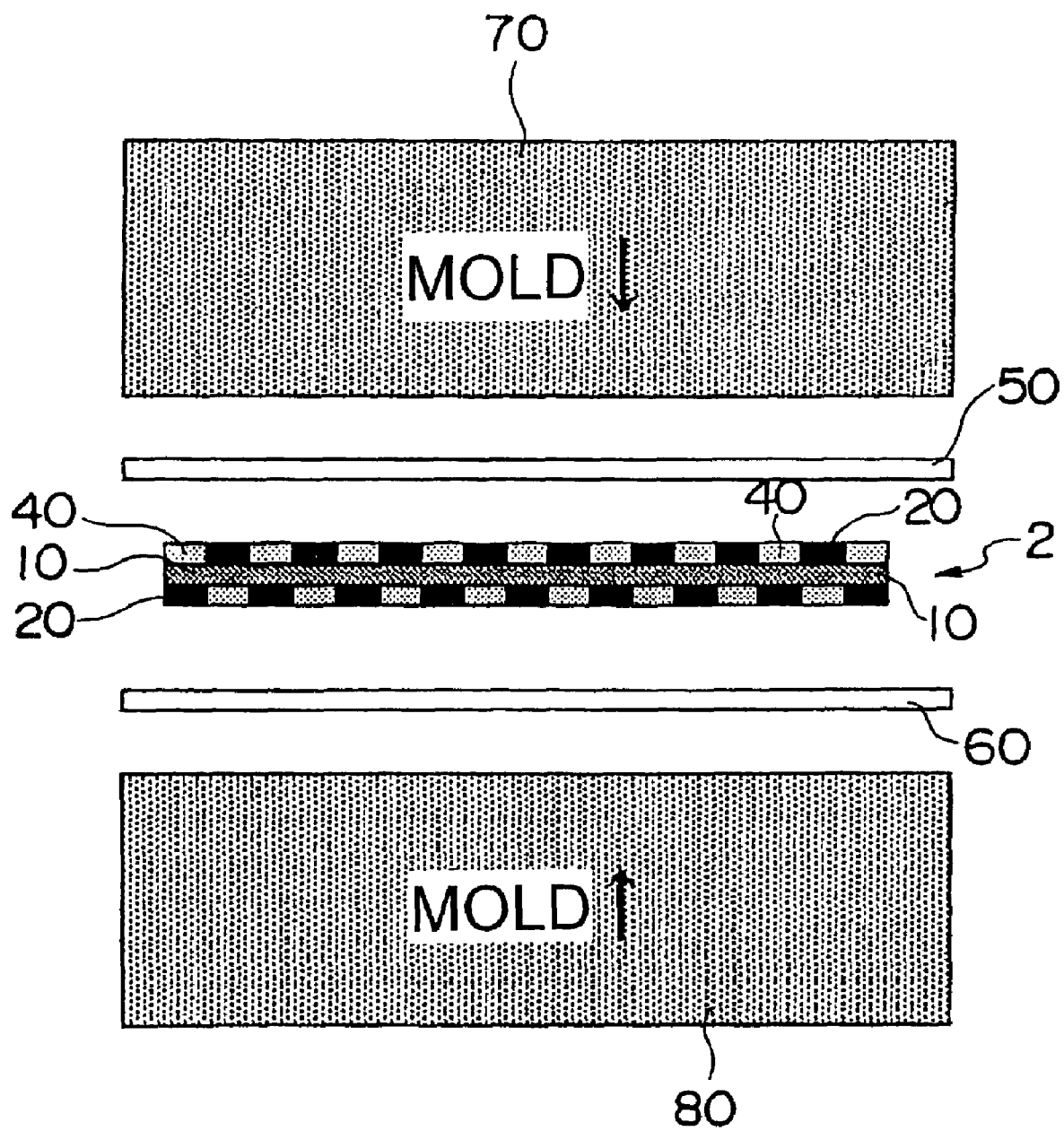
FIG. 6 is an explanatory view showing the manufacturing method according to the prior art.
Figure 7:
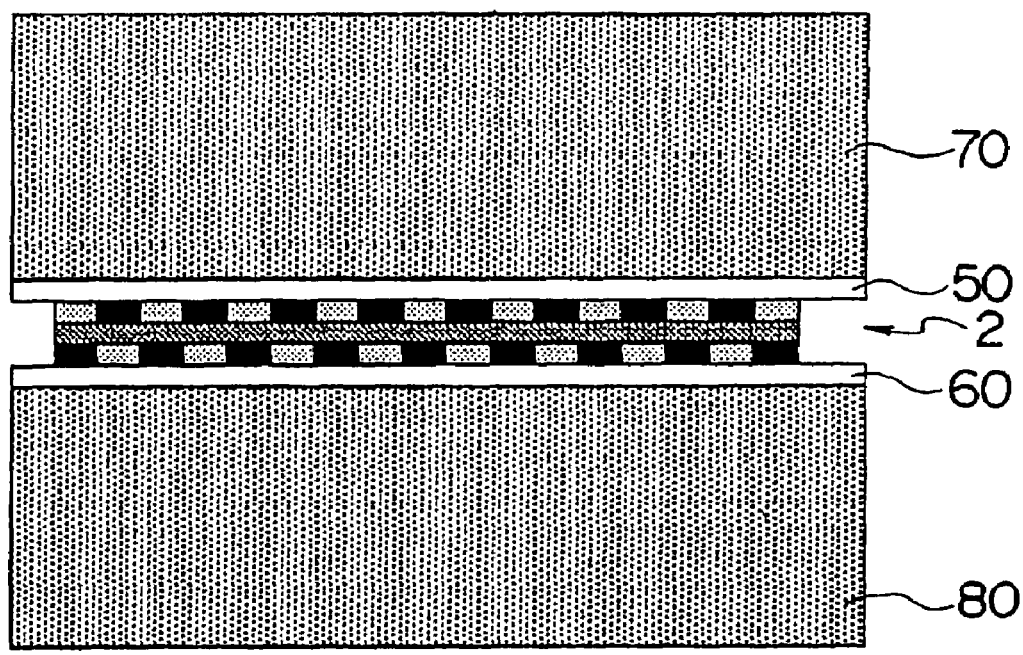
FIG. 7 is an explanatory view showing the manufacturing method according to the prior art.
Figure 8:
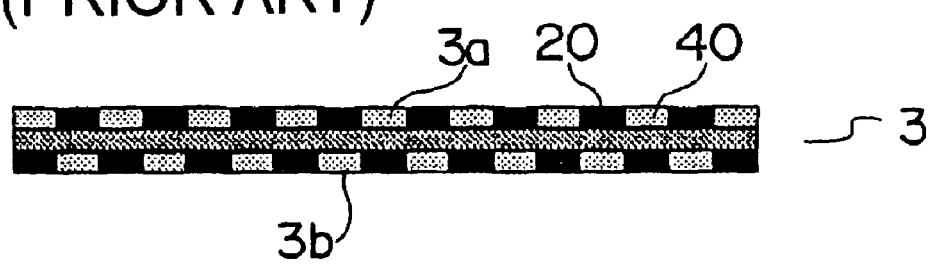
FIG. 8 is an explanatory view of an FRP product according to the prior art.
Figure 9:
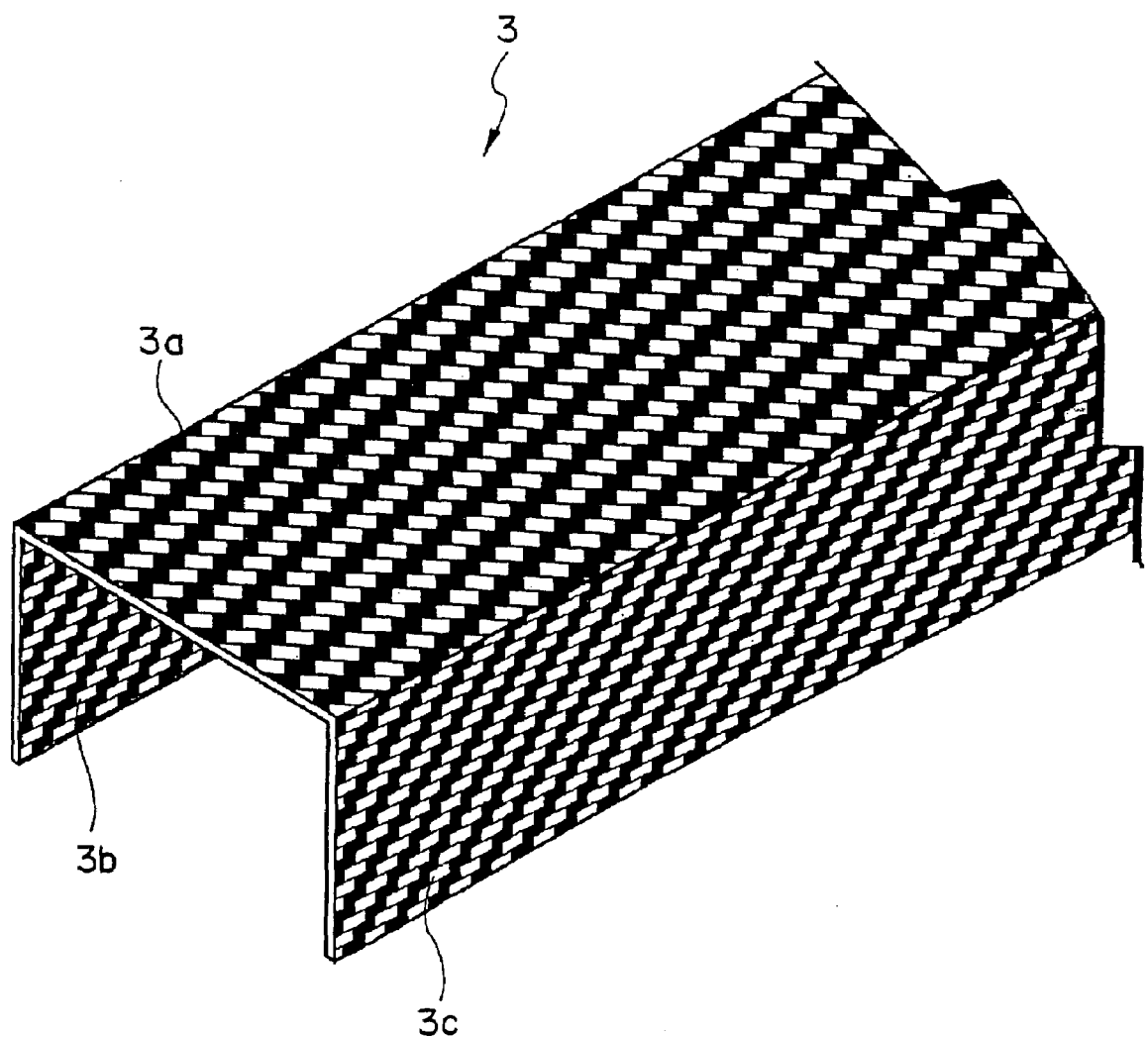
FIG. 9 is an explanatory view of a channel member according to the prior art.

FIG. 4 shows a channel member 5 manufactured by the above-mentioned process. The channel member 5 has an angulated U-shaped cross-section with three faces, 5a, 5b and 5c.

In the channel member 5, both surfaces of each of the three faces 5a, 5b and 5c are provided with the surface texturing pattern. In this case, the release film laminate 100 of the present invention is applied to both surfaces of the prepreg material before performing the hot press.

By providing surface texturing to both sides of the FRP product, the appearance of the product is improved, and the adhesiveness of the product with other members is also improved.

What is claimed is:

1. A method for manufacturing an FRP member with a surface texturing pattern by hot-pressing a prepreg sheet formed by impregnating a woven sheet formed of reinforced fiber with thermosetting resin having a curing temperature of 120 to 130° C., the method comprising:
   heating a hot press mold to at least 120° C., and
   applying a release film laminate
   which is formed by laminating a middle film having a softening temperature of 120° C. between two release films having a softening temperature of 260° C., as a release film between the prepreg sheet and the heated hot press mold, thereby forming a surface texturing pattern on a surface of the FRP member by impression of the fiber.

2. The method of claim 1, wherein the step of applying a release film laminate is further defined by applying a release film laminate with a flat surface.

* * * * *